G. H. RIVES.
PEDAL PAD.
APPLICATION FILED JUNE 21, 1916.

1,216,498.

Patented Feb. 20, 1917.

Inventor
George H. Rives,
By his Attorney
H. T. Criswell.

UNITED STATES PATENT OFFICE.

GEORGE H. RIVES, OF NEW YORK, N. Y.

PEDAL-PAD.

1,216,498.  Specification of Letters Patent.  Patented Feb. 20, 1917.

Application filed June 21, 1916. Serial No. 105,001.

*To all whom it may concern:*

Be it known that I, GEORGE H. RIVES, a citizen of the United States, and a resident of New York, county and State of New York, have invented a certain new and useful Improvement in Pedal-Pads, of which the following is a full, clear, and exact specification.

This invention relates to a class of devices adapted to be used in conjunction with the brakes of vehicles.

My invention has for its object primarily to provide a device, or pad adapted to be applied on the pedal of the brake mechanism for an automobile and like vehicle for serving to prevent the foot of the operator from all tendency to slip from the pedal when applying the brake as well as overcoming the liability of the operator to injure the foot by force of the pressure required in instances when an unusually quick action of the brake is necessitated. This is accomplished mainly by providing a pad which is positioned on the foot pedal of the brake mechanism of a vehicle, and this pad has a pair or a number of pairs of alined recesses extending from opposite parts of its edge and terminating in spaced relation centrally of the pad. Embedded in the pad between its recesses may be one or a number of rigid retaining elements or plates each having threaded recesses one communicating with one of the recesses of the pad. Adjustably screwed in each recess of each retaining element is a threaded locking element, or bolt which projects through the communicating recess of the pad, and all of the bolts are of lengths to extend some distances beyond the edge of the pad. On the projecting ends of the bolts are clips adapted to be guided into engagement with the brake pedal when the bolts are accordingly adjusted so as to releasably hold the pad on the pedal.

Other objects of the invention are to provide stop members one in each recess of the pad for limiting the movement of the clips when forced into engagement with the pad; and to provide a pad of simple and efficient construction which may be made in various shapes and sizes so as to be used on brake pedals of different forms.

A practical embodiment of the invention is represented in the accompanying drawing forming a part of this specification in which similar characters of reference indicate corresponding parts in all the views, the said invention being more fully described hereinafter, and then pointed out in the claims at the end of the description.

In the drawing, Figure 1 is a top plan of one form of pedal pad embodying my invention.

Figure 1:
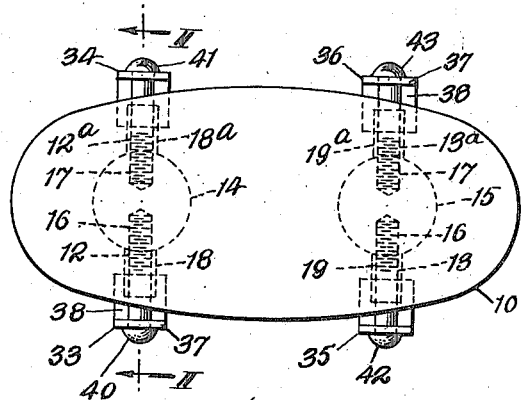
Figure 2:
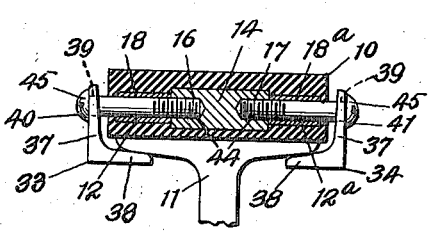
Fig. 2 is a section taken on the line II—II of Fig. 1.

The device has a pad 10 made of rubber, or other resilient material and this pad may be of any desired size in either oval, rectangular, or any other suitable shape for being removably applied on the top of a foot pedal, as 11, of an automobile and like vehicle. In Figs. 1 and 2 of the drawing is illustrated a form of the pad of substantially an oval shape having two spaced pairs of recesses, as 12, 12$^a$ and 13, 13$^a$, and the recesses of each pair extend on alinement from opposite parts of the pad as well as terminating in spaced relation in the central part of the pad.

Embedded in the resilient pad 10 between the recesses 12 and 12$^a$ is a rigid retaining element, or plate 14, and also embedded in the pad, in spaced relation to the plate 14, is a second rigid retaining element, or plate 15. The plates 14 and 15 may be of metal or other suitable material in any desired shapes, and in opposite parts of the edge of each plate are threaded recesses 16 and 17. The threaded recesses 16 and 17 of the plate 14 communicate with the recesses 12 and 12$^a$ of the resilient pad 10, and the threaded recesses of the plate 15 communicate with the recesses 13 and 13$^a$ of the pad.

In the recesses 12, 12$^a$ and 13, 13$^a$ of the resilient pad 10 may be stationary tubular members 18, 18$^a$ and 19, 19$^a$, of metal, or other desired material and these tubular members are of lengths so that one end of each abuts against one of the retaining members, or plates 14 and 15 and so that the other end of each tubular member terminates in slightly spaced relation to the edge of the pad for serving as stops, as will be hereinafter more fully explained.

Figure 3:
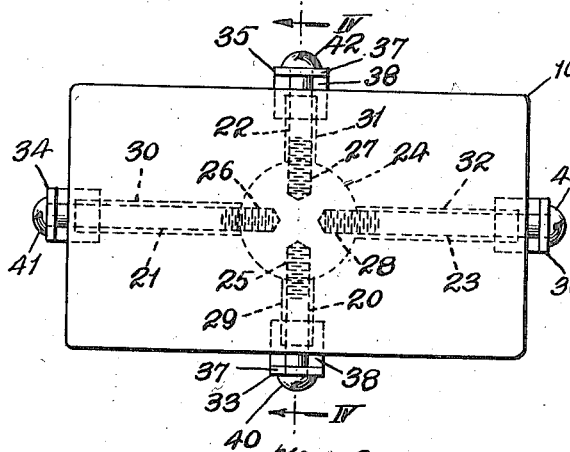
Fig. 3 is a top plan of a slightly different form of the pedal pad.
Figure 4:
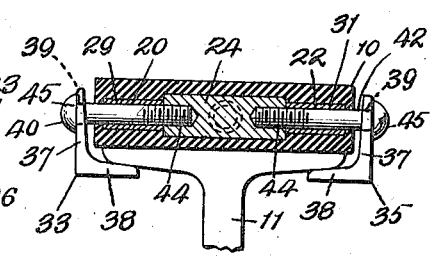
Fig. 4 is a section taken on the line IV—IV of Fig. 3.
Figure 5:
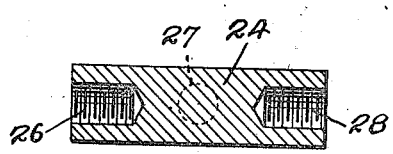
Fig. 5 is an enlarged section taken longitudinally through one of the retaining elements used in the pad.
Figure 6:
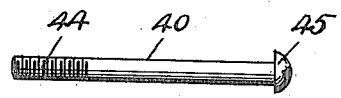
Fig. 6 is an enlarged side view of one of the locking bolts employed in the pad.

Shown in Figs. 3 and 4 is a substantially rectangular resilient pad 10 having recesses 20, 21, 22, 23 disposed in a cross-shaped manner, two of which are on alinement extending from opposite parts of the ends of the pad, while the other two of the recesses extend from opposite parts of the side edges of the pad, and the other ends of all of the recesses terminate in spaced relation centrally of the pad. Embedded in the center of the pad between the opposed ends of the recesses is a single rigid retaining element, or plate 24 of metal or other suitable material, and in the edge of this plate are spaced threaded recesses, as 25, 26, 27, 28, each of which communicates with one of the recesses 20, 21, 22, 23. Like the form of the pad, shown in Figs. 1 and 2, in the recesses 20, 21, 22, 23 may be stationary tubular members 29, 30, 31, 32 arranged so that one of their corresponding ends abuts against the plate 24, and these tubular members are of lengths so that their second ends terminate in close proximity to the edge of the pad to also serve as stops.

In order to releasably fasten one of the resilient pads to the pedal of the brake mechanism of an automobile or like vehicle, the pad is provided with a number of clips, as 33, 34, 35, 36 all of which are preferably similarly formed. Each of these clips is approximately L-shaped to provide a vertically disposed arm 37 and an angularly, or longitudinally disposed arm 38. The clips 33, 34, 35, 36 of each pad when arranged to fasten the pad on a brake pedal are disposed so that their longitudinal arms will be disposed under the pad and under the pedal for engaging the underside of the pedal, and so that the vertical arms of the clips will be disposed upwardly adjacent to the edge of the pad. Through the vertical arm of each of the clips is an opening 39, the clips being arranged so that the openings of all the clips will be in register with the recesses of the respective pad, and to adjustably fasten the clips against accidental movement through the openings 39 of the clips are movably disposed locking elements 40, 41, 42, 43 all of which are inserted into the recesses and through the tubular members of the pad. The locking elements 40, 41, 42, 43 are preferably in the forms of bolts having their inner ends threaded, at 44, for being screwed into the threaded recesses of the retaining element, or plate of their respective pad, and on the outer ends of the bolts are screwheads, as 45.

When one of the pads with its clips and locking bolts is applied on a brake pedal, as explained, by screwing the bolts accordingly the clips will be forced into close engagement with the brake pedal and into the edge of the pad as well as into contact with the free ends of the tubular members of the pad to limit the movement of the clips especially when the pad is somewhat larger than the brake pedal. By driving the bolts home into the retaining element, or plate of the pad the device will be detachably held on the pedal against accidental movement, or displacement for serving to prevent the foot of the operator of the brake mechanism from all tendency to slip when applying the brake.

In the foregoing description, I have embodied the preferred form of my invention, but I do not wish to be understood as limiting myself thereto, as I am aware that modifications may be made therein without departing from the principle, or sacrificing any of the advantages of this invention; therefore I reserve to myself the right to make such changes as fairly fall within the scope thereof.

Having thus described my invention, I claim as new and desire to secure by Letters Patent:—

1. In a device of the character described, a pad adapted to be applied on a pedal, having a pair of alined recesses extending from opposite parts of the edge of the pad and terminating in spaced relation centrally of the pad, a rigid retaining element embedded in the pad between its recesses, a plurality of adjustable clips for releasably engaging the brake pedal to removably hold the pad thereon, and means in the recesses of the pad, engaging the retaining element and engaging the clips for releasably holding the clips against accidental movement.

2. In a device of the character described, a pad adapted to be applied on a pedal, having a plurality of pairs of spaced alined recesses extending from spaced parts of the edge of the pad and terminating in spaced relation centrally of the pad, a rigid retaining element embedded in the pad between its recesses, a plurality of adjustable clips for releasably engaging the brake pedal to removably hold the pad thereon, and means in the recesses of the pad, adjustably engaging the retaining element and engaging the clips for releasably holding the clips against accidental movement.

3. In a device of the character described, a pad adapted to be applied on a pedal, having a pair of alined recesses extending from opposite parts of the edge of the pad and terminating in spaced relation centrally of the pad, a rigid retaining element embedded in the pad between its recesses, a tubular member in each recess of the pad, a plurality of clips for releasably engaging the brake pedal to removably hold the pad thereon, and locking elements in the tubular members adjustably engaging the retaining element and engaging the clips for holding the clips against accidental movement.

4. In a device of the character described, a pad adapted to be applied on a pedal having a plurality of pairs of spaced alined recesses extending from spaced parts of the edge of the pad and terminating in spaced relation centrally of the pad, a rigid retaining element embedded in the pad between its recesses, a tubular member in each recess of the pad, a plurality of adjustable clips for releasably engaging the brake pedal to removably hold the pad thereon, and locking elements in the tubular members adjustably engaging the retaining element and engaging the clips for holding the clips against accidental movement to the pedal.

5. In a device of the character described, a pad adapted to be applied on a pedal, having a pair of alined recesses extending from opposite parts of the edge of the pad and terminating in spaced relation centrally of the pad, a plate embedded in the pad between its recesses, having threaded recesses each communicating with each of the recesses of the pad, a plurality of clips for releasably engaging the brake pedal to removably hold the pad thereon, and a plurality of locking bolts one adjustable in each of the recesses of the pad as well as in the respective communicating recess of the plate for holding the clips against accidental movement.

6. In a device of the character described, a pad adapted to be applied on a pedal, having a plurality of pairs of alined recesses extending from spaced parts of the edge of the pad and terminating in spaced relation centrally of the pad, a rigid retaining element embedded in the pad between its recesses, having threaded recesses each communicating with each of the recesses of the pad, a plurality of tubular members one in each recess of the pad, a plurality of clips for releasably engaging the brake pedal to removably hold the pad thereon, and a plurality of locking bolts one adjustable in each tubular member of the pad as well as in the respective communicating recess of the retaining element for holding the clips against accidental movement.

This specification signed and witnesses this 20th day of June, A. D. 1916.

GEORGE H. RIVES.

Witnesses:
GEORGE F. BENTLEY,
C. SHIEGLEY.